June 13, 1933.  J. R. EAID  1,913,435
AIRPLANE WHEEL
Filed May 16, 1930
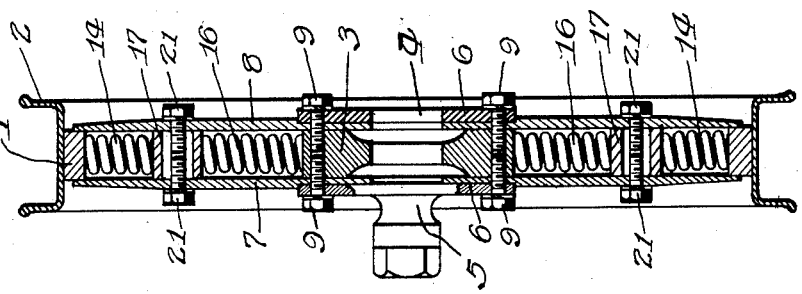
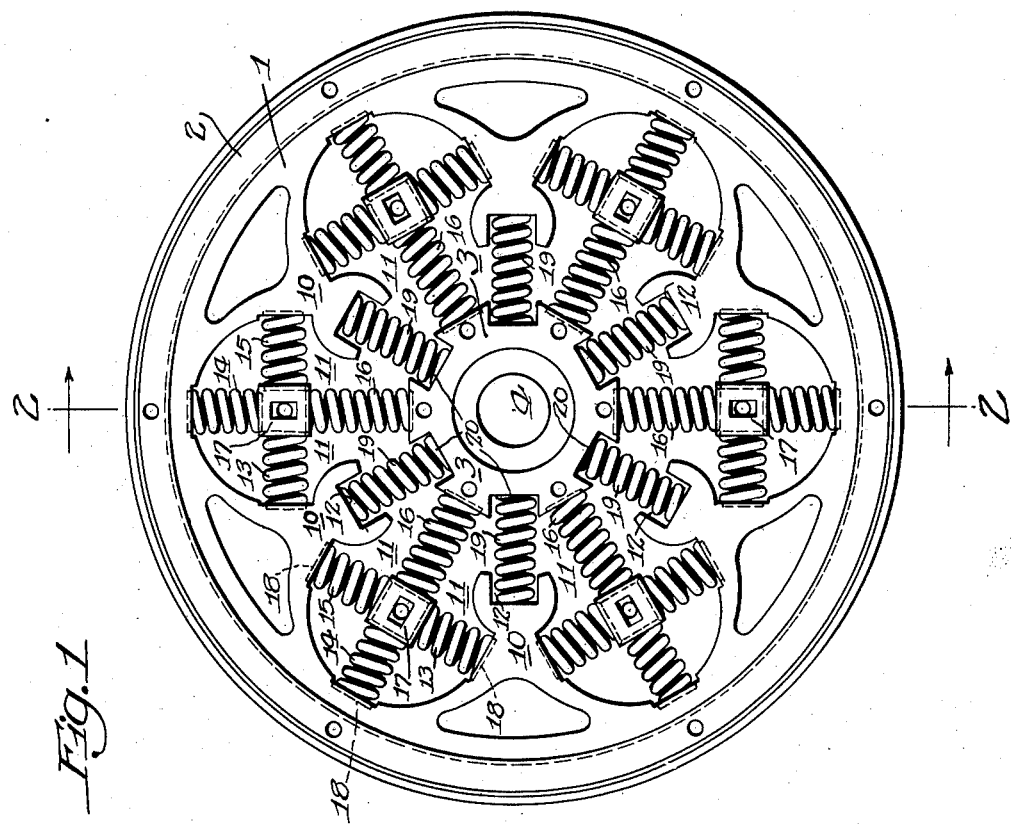
Inventor
John R. Eaid
By Parker Carter Attys Patented June 13, 1933

1,913,435

UNITED STATES PATENT OFFICE

JOHN R. EAID, OF CHICAGO, ILLINOIS

AIRPLANE WHEEL

Application filed May 16, 1930. Serial No. 452,846.

This invention relates to airplane wheels and has for its object to provide a new and improved wheel of this description.

The invention has as a further object to provide an airplane wheel, which, when the airplane is landed, will have the proper resilience so as to properly take care of the blow formed by the landing.

The invention has further objects which are more particularly pointed out in the accompanying description.

Referring now to the drawing:

Fig. 1 is a side view with the side plate omitted showing one form of wheel embodying the invention.

Fig. 2 is a sectional view taken on line 2—2 of Fig. 1.

Like numerals refer to like parts throughout the several figures.

The wheel is made up of two sections, an outer section and an inner section, with springs between them so arranged that regardless of the direction of motion of the wheel in the landing of the airplane, this motion is resisted by springs, there being no solid parts to come in contact with each other during this movement. All the springs move in unison when the movement occurs and all springs act at the same time to resist the shocks.

Referring now to the drawing, I have shown an outer section 1 having upon it any suitable tire supporting rim 2. There is an inner section 3 provided with an opening 4 for the axle. A hub 5 is provided, having the hub plates 6. The axle 6a is shown in place to more clearly bring out the operation of the parts. Plates 7 and 8 are spaced apart and are placed on each side of the central section 3 and are connected to the central section by bolts 9. These plates are provided with slots 9a for these bolts.

The outer section 1 is provided at intervals with the inwardly projecting members 10, which are separated by spaces 11 and which are recessed at 12. In the spaces 11 are a series of springs 13, 14, 15 and 16, all of which engage a centrally located spring engaging part 17.

The walls around the opening 4 are preferably provided with recesses 18 for the ends of the springs 13, 14 and 15. The springs 16 engage the central section 3. Located between the springs 16 are springs 19 which engage the projections 10, the ends fitting into the recess 12. The central section 3 is provided with a series of recesses 20 into which the other ends of the springs 19 fit, as clearly shown in Fig. 1. It will be noted that the springs 16 and 19 overlap; that is, part of each spring 16 is in the same circumferential line containing a part of the spring 19.

This construction permits long springs to be used and permits a maximum number of springs in the space which the wheel provides. The spring engaging parts 17 are connected to the plates 7 and 8 by the connecting elements 21. The plates 7 and 8 slide along the outer part of the outer section 1, there being sufficient space between the outer edges and the rim 2 to permit the desired movement between the outer and inner sections. The springs are placed in position under compression but are arranged to give the proper amount of movement when the airplane lands so as to properly resist and break the shock.

It will be seen that from this arrangement it makes no difference upon what part of the periphery the wheels land, for the same shock resisting action will be produced all around the periphery and all the springs will act simultaneously to resist the shock.

I claim:

1. An airplane wheel comprising an outer section and an inner section, a series of springs interposed between them and engaging both the inner section and the outer section, an intermediate series of springs engaging the inner section and a spring engaging part in a recess in the outer section engaged by each of said latter springs, and a plurality of springs engaging the spring engaging part and engaging the outer section.

2. An airplane wheel comprising an outer section and an inner section, a series of springs interposed between them and engaging both the inner section and the outer section, an intermediate series of springs engaging the inner section and a spring engaging part in a recess in the outer section engaged by each of said latter springs, and a plurality of springs engaging the spring engaging part and engaging the outer section, said latter springs being shorter than the first mentioned springs.

3. An airplane wheel comprising an outer section and an inner section, a series of springs interposed between them and engaging both the inner section and the outer section, an intermediate series of springs engaging the inner section and being of the same length as said first mentioned springs, and a spring engaging part in a recess in the outer section engaged by each of said latter springs, and a plurality of springs engaging each said spring engaging part and engaging the outer section.

Signed at Chicago, county of Cook and State of Illinois, this 13th day of May 1930.

JOHN R. EAID.